United States Patent [19]
Martus et al.

[11] Patent Number: 5,664,811
[45] Date of Patent: Sep. 9, 1997

[54] FUEL FILLER DOOR ACTUATOR ASSEMBLY WITH INTEGRAL KICK-OUT SPRING

[75] Inventors: Charles R. Martus, Oxford; Douglas S. Lanyk, Holly, both of Mich.

[73] Assignee: Lectron Products, Inc., Rochester Hills, Mich.

[21] Appl. No.: 421,423

[22] Filed: Apr. 12, 1995

[51] Int. Cl.[6] ............................................. E05C 1/06
[52] U.S. Cl. ............... 292/144; 296/97.22; 292/DIG. 72; 292/DIG. 61; 292/334
[58] Field of Search .......................... 292/144, DIG. 72, 292/334, 171, 175, 146, 152, DIG. 61; 296/97.22

[56] References Cited

U.S. PATENT DOCUMENTS

| | | | |
|---|---|---|---|
| 1,593,011 | 7/1926 | Bourgon | 292/DIG. 72 |
| 1,653,553 | 12/1927 | Edelmann | 292/175 |
| 2,709,910 | 6/1955 | Vigmostad. | |
| 2,840,405 | 6/1958 | Feltz et al.. | |
| 2,898,138 | 8/1959 | Van Noord.. | |
| 3,915,491 | 10/1975 | Montgomery. | |
| 4,030,322 | 6/1977 | Pettit. | |
| 4,419,641 | 12/1983 | Slavin et al.. | |
| 4,525,004 | 6/1985 | Tanaka | 292/DIG. 72 |
| 4,917,418 | 4/1990 | Gokee. | |
| 4,971,370 | 11/1990 | Detweiler et al.. | |
| 4,978,152 | 12/1990 | Bisbing | 292/169 |
| 5,044,678 | 9/1991 | Detweiler. | |
| 5,076,622 | 12/1991 | Detweiler. | |

FOREIGN PATENT DOCUMENTS

| | | | |
|---|---|---|---|
| 3928580 | 4/1990 | Germany | 296/97.22 |
| 0099418 | 6/1982 | Japan | 292/97.22 |

*Primary Examiner*—Darnell M. Boucher
*Attorney, Agent, or Firm*—Harness, Dickey & Pierce, P.L.C.

[57] ABSTRACT

A release mechanism for use with fuel filler door latch systems that provides superior control of door movement during the entire service life of the motor vehicle. The biasing mechanism of the present invention includes a kick-out spring that acts directly against the striker bar. As such, the kick-out spring is not exposed to over-stressing and does not cause undue wear of the automobile body. The kick-out spring is a leaf spring having a first end that is secured to the housing, an intermediate section routed between posts extending outwardly from the housing, and a cantilevered second end that is oriented to be engaged and resiliently deflected by the striker bar when the fuel filler door is moved toward its closed position. In the closed position, the striker bar forcibly biases the second end of the kick-out spring to a deflected position. Upon release of the striker bar, the kick-out spring acts on the striker bar for urging the fuel filler door to its open position, thereby permitting the kick-out spring to return to its non-deflected position.

24 Claims, 3 Drawing Sheets

FUEL FILLER DOOR ACTUATOR ASSEMBLY WITH INTEGRAL KICK-OUT SPRING

BACKGROUND OF THE INVENTION

The present invention relates generally to fuel filler door latch systems for motor vehicles and, more particularly, to incorporation of a biasing mechanism for moving the fuel filler door to an open position upon release of the latch system.

In an effort to inhibit unauthorized access to a vehicle's fuel tank, some motor vehicles are now equipped with fuel filler door latch systems. Conventional latch systems include a striker bar fixed to the fuel filler door and a latch member mounted to the vehicle body. When the fuel filler door is closed, the latch member is in a "latched" position for lockingly engaging the striker bar. To open the fuel filler door and permit access to the fuel filler cap, the latch member is selectively moved to an "unlatched" position for releasing the striker bar. In key-actuated latch systems, the latch member is moved from its latched position to its unlatched position upon insertion and rotation of the key in a conventional lock mounted to the fuel filler door.

As a convenience option, some motor vehicles are now equipped with fuel filler door latch systems having a remotely-actuated release mechanism. A remotely-actuated release mechanism permits a vehicle occupant seated within the passenger compartment to release the fuel filler door prior to exiting the vehicle. Some remotely-actuated release mechanisms use a linear actuation cable or linkage for manually moving the latch member to its unlatched position in response to the vehicle occupant pulling a spring-biased release handle located within the passenger compartment. Alternatively, some vehicles are equipped with fuel filler door latch systems having an electrically-controlled release mechanism. Such electrically-controlled release mechanisms typically include an electromagnetic solenoid assembly, a push-button release switch located in the passenger compartment of the automobile, and an electrical connection between the solenoid assembly and the release button. When the vehicle occupant depresses the push-button release switch, the solenoid assembly is energized for causing a spring-biased armature associated with the solenoid assembly to move. Since the latch member is mounted for concurrent movement with the armature, such movement of the armature results in corresponding movement of the latch member to its unlatched position, thereby releasing the fuel filler door. These remotely-actuated latch systems provide both a measure of security in limiting access to the automobile's fuel tank and a measure of convenience by allowing a person to remotely open the fuel filler door from within the automobile passenger compartment.

To facilitate movement of the fuel filler door to a partially open position, the above-noted latch systems also typically include a biasing mechanism for forcibly urging the fuel filler door to move away from the automobile body once the striker bar has been released. Typically, such a biasing mechanism includes either a door-mounted spring or a hinge-mounted spring. A door-mounted spring is mounted directly to the distal end of the fuel filler door such that when the fuel filler door is closed, the spring is compressed and bears against a surface in a recessed well portion of the automobile body. When the release mechanism is actuated and the fuel filler door is released, the compressive force acting on the door-mounted spring urges the fuel filler door to move outwardly from its closed position to its open position. Alternatively, a hinge-mounted spring can be mounted within the fuel filler door cavity between the gooseneck hinge of the fuel filler door and an inner wall of the automobile body. Such a hinge-mounted spring is compressed between the body wall and the hinge when the fuel filler door is closed. When the release mechanism is actuated and the door is released, the hinge-mounted spring urges the fuel filler door to move away from the automobile body by applying the compressive load on the gooseneck hinge.

Although both above-noted types of conventional biasing mechanisms perform satisfactorily for their intended purpose of opening the fuel filler door, both have associated limitations. For instance, the door-mounted spring tends to create wear on the painted well surface of the automobile body due to its contact therewith when the door is closed and when the spring urges the door away from the automobile body upon the actuation of the release mechanism. Such wear may permit subsequent corrosion and deterioration of the automobile body in the fuel filler door area. Also, the door-mounted spring is aesthetically undesirable and susceptible to damage since it is external to the fuel filler chamber so as to be visible when the fuel filler door is open. With respect to hinge-mounted springs, such a spring is typically designed with a relatively large spring constant since it must be compact to fit in the limited space between the fuel filler door wall and the hinge. As such, the hinge-mounted spring exerts a large load against the gooseneck hinge which can cause the fuel filler door to open too far. Further, the fuel filler door assembly is typically installed in the vehicle before it is painted. Thus, the hinge-mounted spring is often exposed to elevated temperatures in the paint curing ovens which can cause detrimental stress relief, thereby decreasing the spring constant and the ability of the spring to exert the desired load on the hinge. Also, hinge-mounted springs can be subjected to over-stressing during assembly.

SUMMARY OF THE INVENTION

Accordingly, it is a primary object of the present invention to overcome the disadvantages of the prior art and to provide a release mechanism for use with fuel filler door latch systems that provides superior control of door movement during the entire service life of the motor vehicle. In general, the biasing mechanism of the present invention includes a kick-out spring that acts directly against the striker bar. As such, the kick-out spring is not exposed to over-stressing and does not cause undue wear of the automobile body.

In accordance with a preferred embodiment, the kick-out spring is mounted to the housing of an electromagnetic solenoid actuator used in association with an electrically-controlled release mechanism for a fuel filler latch system. The solenoid actuator includes a movable armature to which a latch member is secured for movement relative to a striker bar that is fixed to the fuel filler door. Movement of the armature in a first direction causes the latch member to move to a latched position whereat it lockingly engages the striker bar for holding the fuel filler door in a closed position. In the closed position, the striker bar acts on and deflects the kick-out spring. Subsequent energization of the solenoid actuator causes movement of the armature in a second direction which concurrently causes movement of the latch member to an unlatched position for releasing the striker bar. Upon release of the striker bar, the kick-out spring exerts a load on the striker bar for urging the fuel filler door to move to an open position. More preferably, the kick-out spring is a leaf spring having a first end that is secured to the solenoid housing, an intermediate section routed between posts extending outwardly from the solenoid housing, and a cantilevered second end that is oriented to be engaged and resiliently deflected by the striker bar when the fuel filler door is moved toward its closed position. In the closed position, the striker bar forcibly biases the second end of the kick-out spring to a deflected position. Upon release of the striker bar, the kick-out spring acts on the striker bar for urging the fuel filler door to its open position, thereby permitting the kick-out spring to return to its non-deflected position. The kick-out spring is characterized by a spring constant that allows it to exert a load on the striker bar that urges the door to a more predetermined kick-out distance from the automobile body.

The width of the kick-out spring is tapered so that its second end is wider than the first end and yet is of a uniform thickness. With the fuel filler door closed, a top surface of the cantilevered second end of the kick-out spring applies a load onto a bottom surface of the striker bar while an overslam bumper mounted to the bottom surface of the second end of the spring acts as a cushioned doorstop for preventing the kick-out spring from being over stressed.

Additional objects and advantages of the present invention will become apparent from a reading of the following detailed description of the preferred embodiment taken in conjunction with the accompanying drawings and appended claims.

DETAILED DESCRIPTION OF THE PREFERRED EMBODIMENT

In general, the present invention is directed to an improved biasing mechanism for moving a hinged door from a closed position to an open position following release of the hinged door upon actuation of a door latch system. More particularly, the biasing mechanism is preferably used in association with remotely-actuated (i.e., mechanically-controlled or electrically-controlled) release mechanisms for fuel filler door latch systems of the type used on motor vehicles. For purposes of illustration only, the biasing mechanism of the present invention is shown in association with a solenoid-operated release mechanism similar to that disclosed in commonly owned U.S. Pat. No. 5,044,678, the entire disclosure of which is hereby incorporated by reference.

Figure 1:
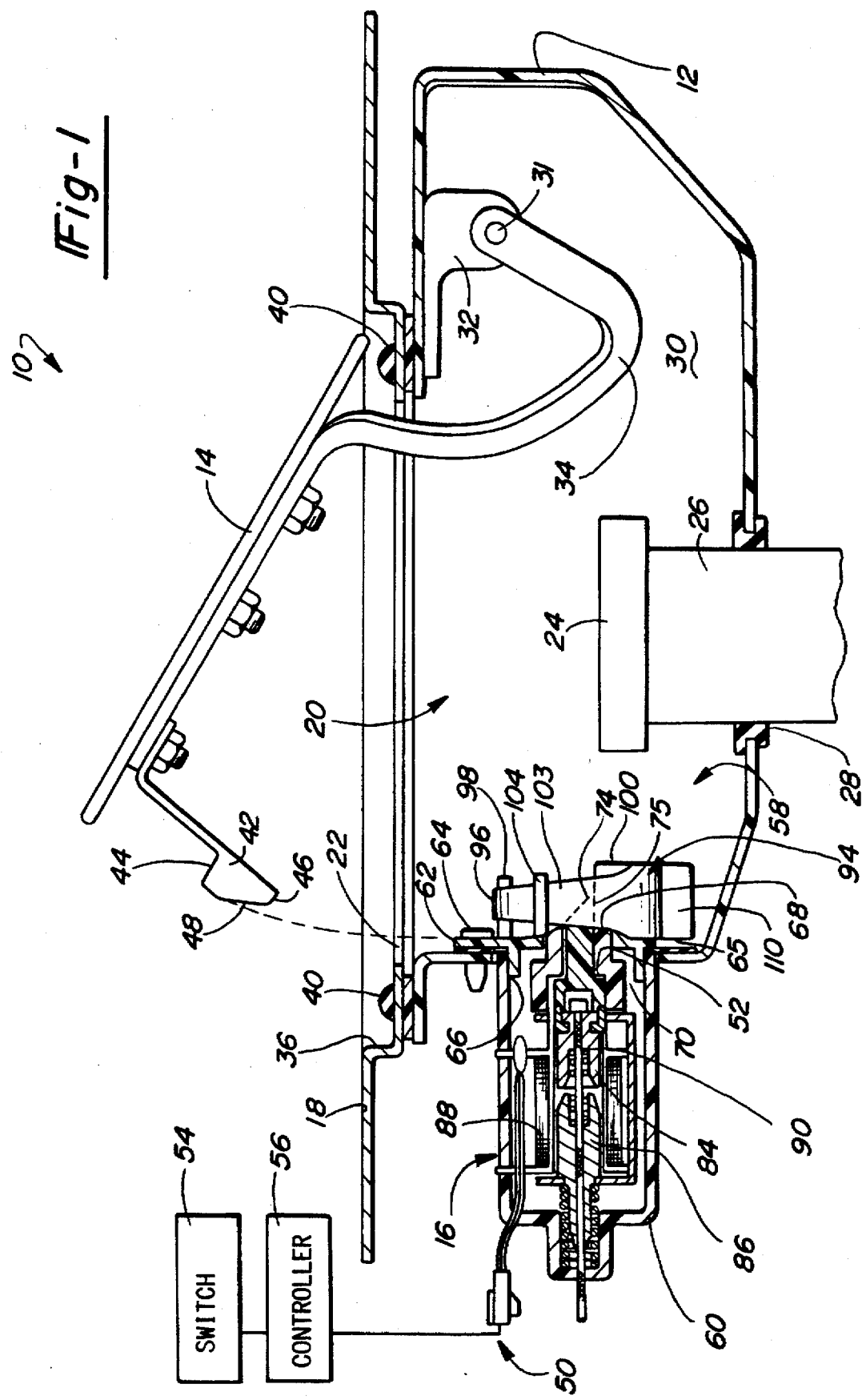
FIG. 1 is a sectional view of an exemplary fuel filler door latch system equipped with the door biasing mechanism of the present invention.

Referring now to FIG. 1 of the drawings, an automobile fuel door housing assembly 10 is shown to generally include a housing 12, a hinged fuel filler door 14, and an electro-magnetic solenoid actuator 16. Housing 12 is preferably made of material resistant to the corrosive effects of gasoline. More preferably, housing 12 is manufactured from a blow molded high density polyethylene (HDPE) material. Housing 12 is suitably mounted to the vehicle's rear body panel 18 such that the housing's access opening 20 is aligned with an opening 22 in body panel 18 to provide access to a fuel cap 24 and a fuel filler pipe 26 for filling the vehicle's fuel tank (not shown). As seen, fuel pipe 26 extends through a sealed aperture 28 formed in housing 12 such that it and fuel cap 24 are located within chamber 30 of housing 12.

Fuel filler door 14 is pivotably mounted to housing 12 by a pivot joint 31 established between a hinge bracket 32 fixed to housing 12 and a gooseneck hinge 34 to which door 14 is mounted. As is known, fuel door 14 prevents access to chamber 30 when moved from the partially open position shown to a closed position covering access opening 20. As described in more detail below, fuel door 14 permits access to fuel chamber 30 when it is moved to an open position through rotation of gooseneck hinge 34 around pivot joint 31. Preferably, when closed, fuel filler door 14 is seated within a recessed well 36 of body panel 18 to provide an aesthetically pleasing fit upon assembly of fuel filler door assembly 10 onto body panel 18. Paint is applied to the exterior of fuel door 14, housing well 36 and automobile body panel 18, giving the automobile its finished appearance. Further, resilient bumpers 40 are typically installed in housing well 36 to cushion the closing of door 14. Fuel door 14 also includes a striker bar 42 having a transverse locking shoulder 44, a bottom surface 46, and a camming surface 48 therebetween. As will be described, striker bar 42 works in cooperation with a remotely-actuated electrically-controlled release mechanism 50 for releasing striker 42 from latched engagement with a latch member 52, thereby opening fuel door 14.

In accordance with the embodiment shown, solenoid actuator 16 is generally similar in construction and function to that disclosed in the above-noted commonly owned U.S. Pat. No. 5,044,678 and which is manufactured and sold by Lectron Products, Inc. of Rochester Hills, Mich. under Part No. 25603294. In particular, solenoid actuator 16 includes a self-compensating latch mechanism which is provided for releasably latching striker bar 42 when fuel filler door 14 is in its closed position. A push-button or toggle switch 54, located within the passenger compartment of the motor vehicle, can be selectively actuated by a vehicle occupant for sending a suitable electrical control signal to controller device 56 which, in turn, energizes solenoid actuator 16 for causing latch mechanism 52 to move to an "unlatched" position, thereby releasing striker bar 42. In the particular construction shown, latch member 52 is retracted in response to energization of solenoid actuator 16 for disengaging locking shoulder 44 of striker bar 42. As will be detailed hereafter, a biasing mechanism 58 is resiliently deflected so as to exert a biasing force on striker bar 42 when fuel filler door 14 is moved to its closed position. The biasing force is such that biasing mechanism 58 is capable of forcibly moving filler door 14 to the partially open position shown in response to movement of latch mechanism 52 to its unlatched position. Thereafter, the vehicle operator can pivot filler door 14 about pivot joint 31 to a fully open position to permit access to fuel cap 24 and filler pipe 26. Particular reference can be had to the incorporated and commonly owned U.S. Pat. No. 5,044,678 for disclosure of the function, structure and operation of the self-compensating components associated with solenoid actuator 16.

With continued reference to FIG. 1, solenoid actuator 16 is shown to include a hollow solenoid housing 60 that is secured to, or formed integral with, a transverse mounting flange 62. Suitable fasteners 64 are inserted through alignable mounting holes formed in wall 65 of housing 12 and mounting flange 62, thereby securing solenoid actuator 16 to housing 12. Housing wall 65 has an aperture 66 through which solenoid housing 60 extends. Likewise, mounting flange 62 has an aperture 68 through which a portion of a movable tubular guide member 70 is disposed so as to extend into chamber 30. Guide member 70 has a central passage in which movable latch member 52 is disposed such that its distal end 74 extends out of guide member 70 and into chamber 30 and which has a blocking surface 75 that is adapted to lockingly engage locking surface 44 of striker bar 42. As seen, latch member 52 is coupled to an armature 84 that is supported for movement relative to a stationary pole piece 86 in response to the magnitude of an electromagnetic field generated by magnetic coil 88 in response to the electrical signal supplied thereto by electric controller 56. In operation, actuation of switch 54 causes electrical controller 56 to energize magnetic coil 88 for causing armature 84 to be drawn toward pole piece 86, in opposition to the biasing of armature spring 90, for causing concurrent movement of latch member 52 from its extended "latched" position shown to a retracted "unlatched" position. As such, current flow through coil windings 88 establishes a magnetic flux path through solenoid actuator 16 for generating a desire refractive magnetic force capable of moving armature 84 toward stationary pole piece 86.

When it is desired to move fuel door 14 from its closed and locked position to an open position, solenoid actuator 16 is energized. When solenoid actuator 16 is in its normal de-energized state, latch member 52 engages locking shoulder 44 of striker bar 42 thereby preventing fuel filler door 14 from being opened. When solenoid actuator 16 is energized, armature 84 and latch member 52 retract inwardly relative to housing 60. As latch member 52 retracts, it releases shoulder 44 of striker bar 42 from engagement with blocking surface 75. Once released, fuel door 14 is capable of being opened by rotation of fuel door 14 about pivot 31 in an outward direction away from housing well 36 and body panel 18. When it is desired to move fuel door 14 from an open position to a closed position, door 14 is moved inwardly so that surfaces 46 and 48 of striker bar 42 are urged over the tapered tip 74 of latch member 52, and into its latched position in which shoulder 44 engages the underside locking surface 75 of latch member 52.

With particular attention drawn now to FIGS. 2 through 4B, the unique components and function of biasing mechanism 58 is shown in greater detail. In general, biasing mechanism 58 is functional to apply a biasing load on striker bar 42 when fuel filler door 14 is lockingly held in its closed position that is of a sufficient magnitude to move fuel filler door 14 to a partially open position in response to release of striker bar 42 from latched engagement with latch member 52. Preferably, the biasing load established by biasing mechanism 58 can be controllably selected to move door 14 to a desired "kick-out" position. As noted, the vehicle operator can thereafter rotate fuel filler door 14 about pivot hinge 31 to a fully open position to facilitate re-fueling of the vehicle.

Figure 2:
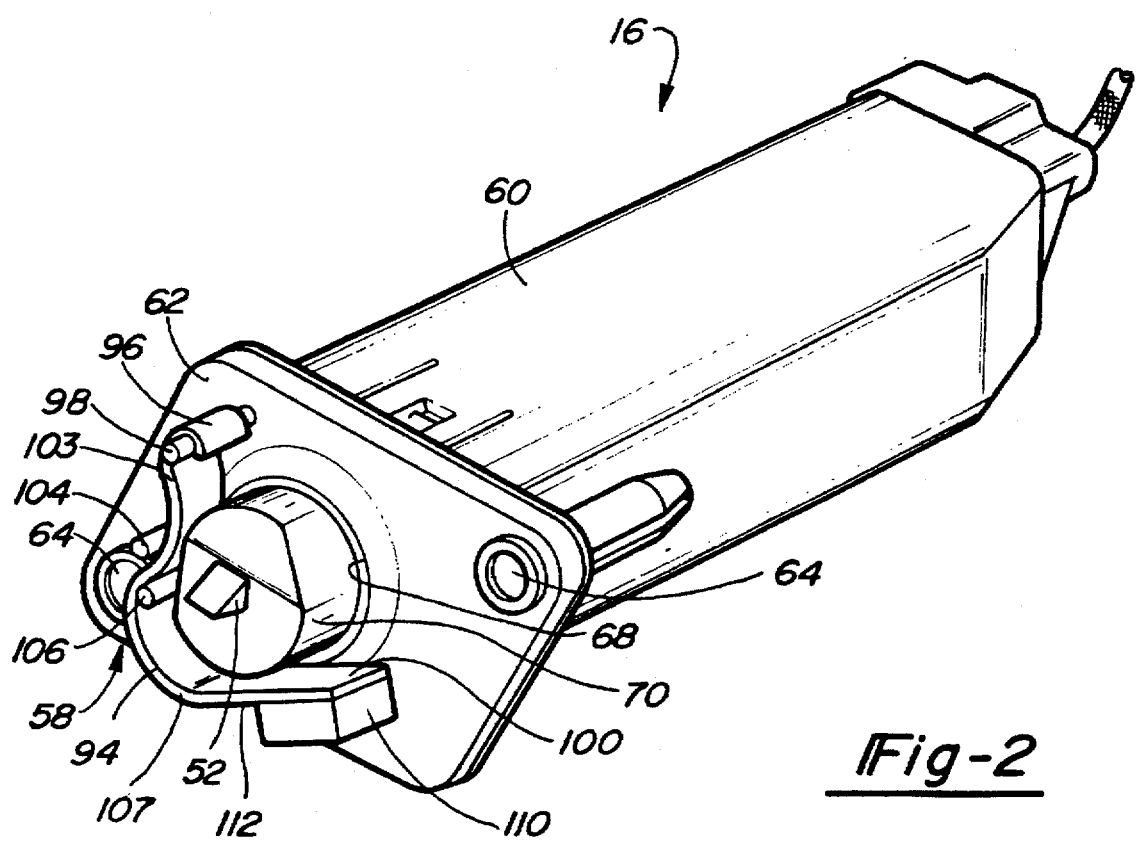
FIG. 2 is a perspective view of the door biasing mechanism mounted to the solenoid actuator shown in FIG. 1.

Biasing mechanism 58 includes a leaf spring 94 having a first end 96 fixed to a post 98 extending from mounting flange 62 and a cantilevered second end 100 disposed adjacent to the latch components (tubular guide member 70 and latch member 52) of solenoid actuator 16 and against which lower surface 46 of striker bar 42 is adapted to directly engage. FIG. 2 is a perspective view of biasing mechanism 58 assembled onto the front face of mounting flange 62 and illustrating second end 100 of leaf spring 94 in its normal "non-deflected" position. As seen, first end 96 of leaf spring 94 includes a hooked section which surrounds and is supported on post 98. In addition, an intermediate section of leaf spring is shown to include a portion 103 near first end 96 that is alternately routed between a pair of biasing posts 104 and 106 for exerting a predetermined preload on leaf spring 94 for assisting and maintaining second end 100 in its non-deflected state when striker bar 42 is disengaged therefrom. The intermediate section of leaf spring 94 also includes an arcuate portion 107 provided adjacent to second end 100. Second end 100 is generally linear and is relatively long in comparison to the other portions of leaf spring 94. Being formed in such a configuration, leaf spring 94 of the present invention has a relative low spring rate. Thus, the kick-out distance of fuel filler door 14 can be easily controlled.

In a preferred form, leaf spring 94 is formed from stainless steel, a high density plastic, or any other resilient material capable of retaining its resilient elastic deformation characteristics over a cyclical service life of repeated latchings and unlatchings of fuel filler door 14. More preferably, leaf spring 94 is of uniform thickness along its entire length and has a variable width such that second end 100 is greater in width than first end 96. Preferably, the change in width includes a tapered section (FIGS. 3B and 4B) formed along arcuate portion 107 of the intermediate segment of leaf spring 94. In addition, an overslam bumper 110 is mounted to an underside surface 112 of second end 100 of leaf spring 94 which is adapted to engage a wall portion of housing 12 upon movement of door 14 to its closed and locked position. To allow ease of installation, leaf spring 94 is preferably mounted to mounting flange 62 of solenoid housing 60 prior to assembly of solenoid actuator 16 into housing 12.

Figure 3A:
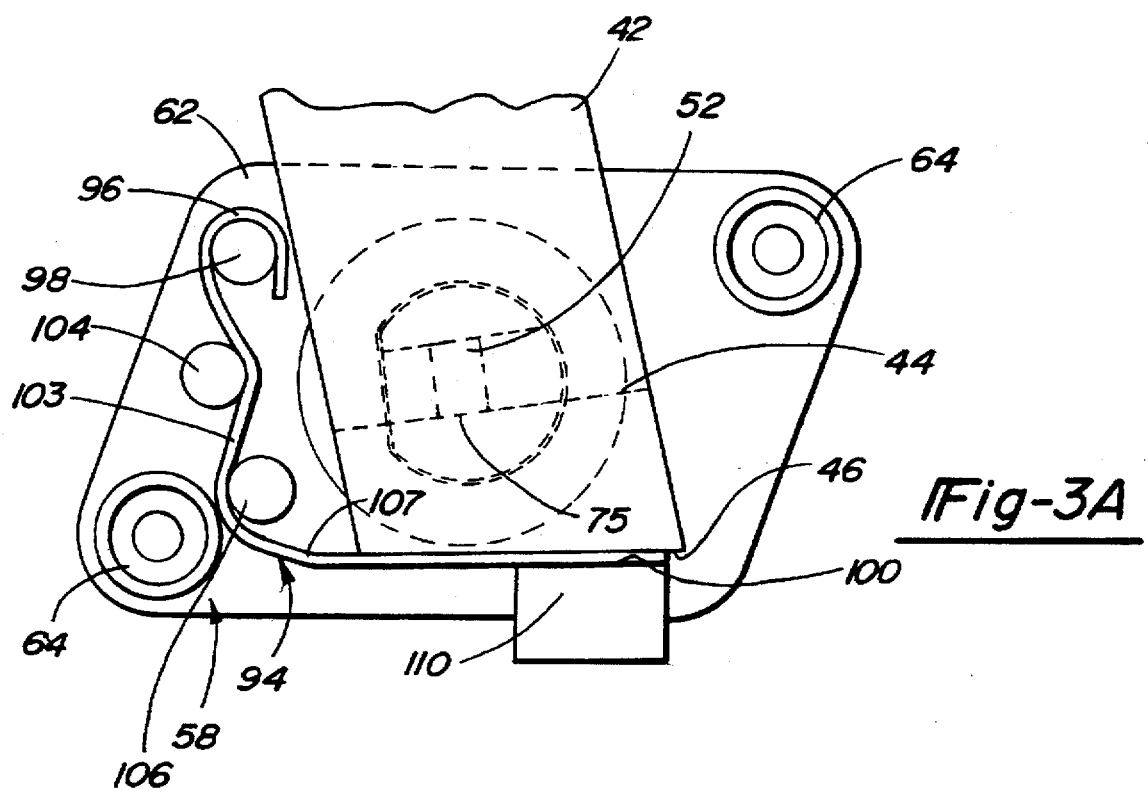
FIG. 3A is an end view of the solenoid actuator shown in FIGS. 1 and 2 with the door biasing mechanism in a "biased" condition when the fuel filler door is closed.
Figure 4A:
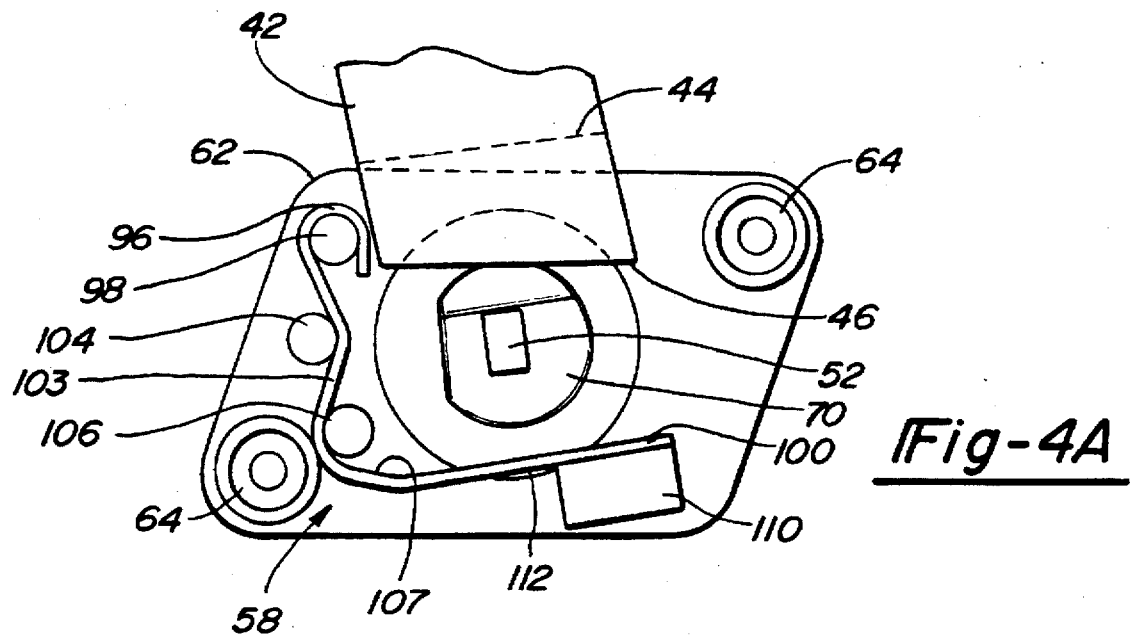
FIG. 4A is an end view, similar to FIG. 3A, showing the door biasing mechanism in a "released" condition when the duel filler door is open.
Figure 3B:
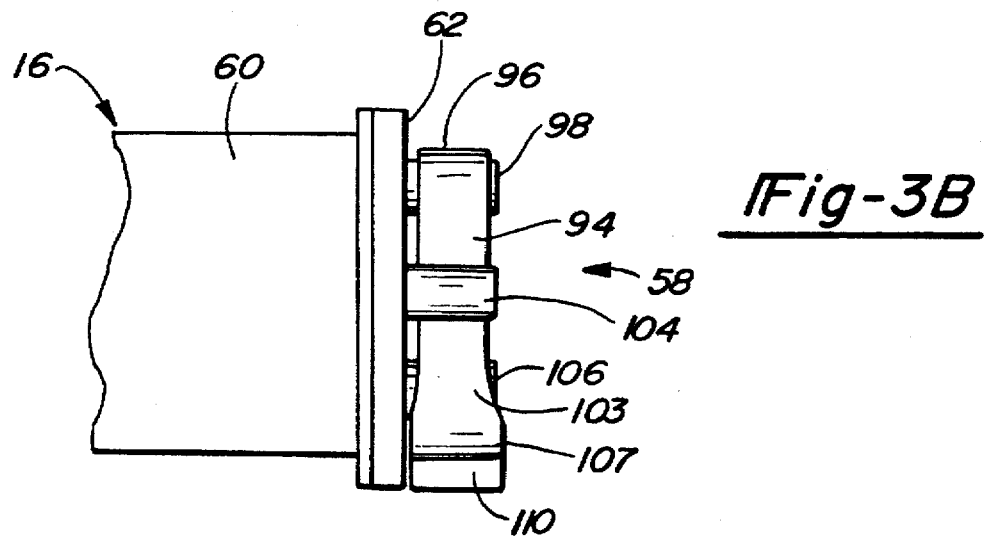
FIG. 3B is a partial side view of the solenoid actuator shown in FIG. 3A, as viewed in the direction of Arrow A.
Figure 4B:
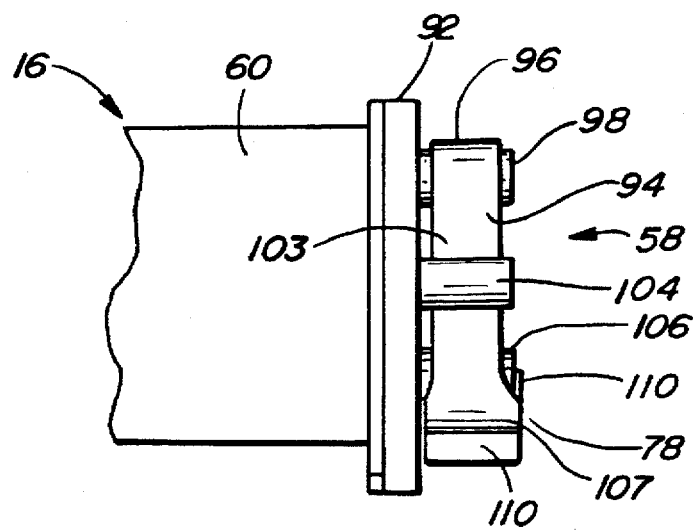
FIG. 4B is a partial side view of the solenoid actuator shown in FIG. 4A, as viewed in the direction of Arrow B.

With particular reference to FIGS. 3A and 3B, the position of leaf spring 94 when fuel filler door 14 is closed and striker bar 42 is lockingly engaged by latch member 52 is shown. In particularly, it can be seen that shoulder surface 44 of striker bar 42 is lockingly abutting underside surface 75 of latch member 52. In this position, lower surface 46 of striker bar 42 acts directly on second end of leaf spring 94 and forcibly biases it from its normal non-deflected position to the "deflected" position shown. To prevent excessive deflection of second end 100 of leaf spring 94, overslam bumper 110 will engage a bottom surface of housing 12 when striker bar 42 is lockingly engaged with latch member 52. As seen from FIGS. 4A and 4B, when latch member 52 is retracted and striker bar 42 is released from locked engagement therewith, second end 100 of leaf spring 94 is free to exert a biasing load on end 46 of striker bar 42 which causes striker bar 42 to move to its "kick-out" open position in response to leaf spring 94 returning to its non-deflected position. Preferably, the biasing of leaf spring 94 is selected such that fuel filler door 14 kicks-out to a position whereat the distal edge of door 14 is approximately 20 mm from the edge of body panel 18.

It should be appreciated that kick-out spring 94 exhibits several desirable characteristics not found in prior fuel filler door biasing arrangements. By being mounted directly to solenoid housing 62 and thus being an integral component of solenoid actuator 16, leaf spring 94 is retained within chamber 30 and is thus protected from exposure to accidental bending or over-stressing. Further, by being mounted to flange 62, leaf spring 94 does not apply a load directly to any finished surface of the automobile body, and thus does not cause premature wear thereto. Further, leaf spring 94 of the present invention is mounted to flange 62 of solenoid actuator 16 and is not mounted within chamber 30 until solenoid actuator 16 is mounted to housing 12. Thus, leaf spring 94 is not subjected to over-stressing caused by fuel door 14 being pushed too far into chamber 30 prior to solenoid actuator 16 being mounted.

While the above description constitutes the preferred embodiment of the present invention, it should be appreciated that the invention may be modified without departing form the proper scope or fair meaning of the accompanying claims. In particular, it should be appreciated that the above-described biasing mechanism may be used with any release mechanism requiring a selective latching and unlatching of a hinged door, such as automotive hood and deck lid latching systems. Various other advantages of the present invention will become apparent to those skilled in the art after having the benefit of studying the foregoing text and drawings, taken in conjunction with the following claims.

What is claimed is:

1. A biasing mechanism for a door latch system of the type mounted to a motor vehicle structure and engageable with a striker bar mounted on a hinged door, the biasing mechanism comprising:

a mounting flange adapted for mounting to the motor vehicle structure, said mounting flange having a first face defining a passage adapted to accommodate a movable latch member of the door latch system; and a leaf spring having a first end coupled to said first face and a cantilevered second end adapted to move in a plane substantially parallel to said first face from a non-deflected position to a deflected position in response to engagement of the striker bar therewith upon movement of the hinged door from an open position to a closed position, said second end of said leaf spring being held in said deflected position when the hinged door is latched in the closed position by the latch member lockingly engaging the striker bar, and wherein movement of the latch member releases the striker bar from locked engagement therewith such that said leaf spring forcibly urges the door to move from the closed position to the open position.

2. The biasing mechanism of claim 1 wherein said first end of said leaf spring includes a hooked portion retained on a post extending outwardly from said first face.

3. The biasing mechanism of claim 1 further including a second post extending outwardly from said first face of said mounting flange and wherein said leaf spring includes an intermediate section between its first and second end portions, said intermediate portion cooperating with pre-loading means extending from said mounting flange for exerting a preload on said second end of said leaf spring for normally biasing said second end of said leaf spring to its non-deflected position.

4. The biasing mechanism of claim 3 wherein said intermediate section of said leaf spring has a tapered width such that said second end of said leaf spring is greater in width than said first end thereof.

5. The biasing mechanism of claim 1 further comprising a bumper mounted to an underside surface of said second end of said leaf spring, said bumper adapted to engage a portion of the vehicle structure and limit deflection of said leaf spring in response to movement of said leaf spring from said non-deflected position to said deflected position.

6. The biasing mechanism of claim 1 wherein the door latch system includes a solenoid actuator having a coil winding, a pole piece, and an armature coupled to the latch member for causing movement thereof from a latched position to an unlatched position in response to selective energization of said coil winding, and wherein said biasing mechanism further includes an actuation member located within the passenger compartment of the motor vehicle for causing energization of said coil winding in response to actuation thereof, thereby remotely actuating the door latch system to release and open the hinged door.

7. A door assembly comprising:

a first housing;

a door pivotably coupled to said first housing for movement between an open position and a closed position, said door having a striker bar with a distal end;

a latch assembly including a second housing coupled to said first housing, a latch member movable along a first axis from an engaged position wherein said latch member is lockingly engageable with said striker bar when said door is in said closed position to a disengaged position, one of said first housing and said second housing defining a first surface substantially perpendicular to said first axis; and a spring mounted to said first surface for movement in a plane substantially parallel to said first surface from a non-deflected position to a deflected position in response to engagement with said distal end of said striker bar upon movement of the door from said open position to said closed position, and wherein movement of the latch member from said engaged position toward said disengaged position releases the striker bar from locked engagement therewith such that said spring forcibly urges said door to move from said closed position to said open position.

8. The door assembly of claim 7 wherein said second housing includes a mounting flange defining said first surface.

9. The door assembly of claim 7 further including a plurality of posts extending from said first surface, wherein said spring includes a first end section secured to the first surface, an intermediate section extending from said first end and which is routed between a plurality of posts extending from the first surface, and a cantilevered second end section extending from said intermediate section and which is adapted to deflect in response to engagement with a striker bar mounted to the door when the door is moved from an open position toward the closed position, whereby such deflection of said second end section of said spring forcibly urges the door to move to the open position when the latch assembly releases the striker bar.

10. The door assembly of claim 7 wherein the latch assembly is a remotely-actuated solenoid actuator.

11. The door assembly of claim 10 wherein said solenoid actuator comprises:

a pole piece mounted within said second housing;

an armature normally biased to an extended position away from said pole piece and which is movable to a retracted position toward said pole piece when said solenoid actuator is actuated;

a solenoid winding surrounding portions of said pole piece and said armature, said solenoid winding generating a electromagnetic attractive force for moving said armature to said retracted position when said winding is energized;

said latch member coupled for movement with said armature, said latch member engaging the striker bar when said armature is in said extended position and said latch member is in said engaged position for holding the door in its closed position, said latch member releasing the striker bar when said armature is in said retracted position and said latch member is in said disengaged position; and means for selectively energizing said solenoid windings.

12. The door assembly of claim 9 wherein said spring is tapered so that said end section is greater in width than said first end section.

13. The door assembly of claim 9 wherein, upon deflection, said second end of said spring applies a load directly to said distal end of said striker bar.

14. The door assembly of claim 9 further comprising a bumper attached to said second end of said spring, said bumper adapted to engage a portion of said first housing to limit deflection of said spring when the door is moved to its closed position.

15. A door latch assembly for use in opening and closing a fuel filler door that is hinged to a motor vehicle body for movement between open and closed positions, the fuel filler door providing access to an inner chamber having a fuel tank access opening, the fuel filler door including a striker bar extending into the chamber when the door is in the closed position, said door latch assembly comprising:

a solenoid-actuated latch apparatus contained within the chamber, said solenoid-actuated latch apparatus including a housing having a mounting flange secured to a wall of the chamber, a pole piece and a coil winding surrounding said pole piece, both being fixed within said housing, an armature supported for movement in a first direction relative to said pole piece between a first position when said coil winding is de-energized and a second position when said coil winding is energized, biasing means for normally biasing said armature to said first position, and a latch member coupled for concurrent movement in said first direction with said armature, said latch member lockingly engaging the striker bar when said armature is in said first position and the door is closed for holding the door in the closed position, said latch member releasing the striker bar when said armature is in said second position, said housing having a face substantially perpendicular to said first direction; and a door biasing mechanism mounted to said face of said housing including a spring that is adapted to deflect in a plane substantially parallel to said face of said housing in response to contact with the striker bar when the door is moved to the closed position, whereby in its deflected condition said spring exerts a biasing load on the striker bar for urging the door to move to an open position away from the vehicle body when said latch member releases the striker bar.

16. The door latch assembly of claim 15 wherein said spring is a leaf spring having a first end secured to said mounting flange on said housing and a second end adapted to elastically deflect in a plane substantially parallel to said face of said housing from a non-deflected position to a deflected position in response to engagement of the striker bar therewith upon the door being moved to its closed position.

17. The door latch assembly of claim 16 wherein said first end of said leaf spring includes a hooked portion retained on a post extending outwardly from said face of said housing mounting flange.

18. The door latch assembly of claim 16 wherein said second end of said leaf spring is wider than said first end.

19. The door latch assembly of claim 16 further comprising a bumper mounted to an underside surface of said second end of said leaf spring which is engageable with a portion of said housing upon the door being closed to limit deflection of said leaf spring.

20. A remotely-actuated solenoid assembly for a door latch system having a hinged door with a striker bar mounted thereto, comprising:

a housing defining a planar surface;

a pole piece mounted within said housing;

an armature movable along an axis substantially perpendicular to said planar surface between an extended position displaced from said pole piece when not attracted to said pole piece and a retracted position when attracted toward said pole piece;

a solenoid winding surrounding portions of said pole piece and said armature, said solenoid winding operable for attracting said armature to move toward said pole piece when said winding is energized;

latch means associated with said movable armature for lockingly engaging the striker bar when the door is closed and said armature is in said extended position, said latch means operable for releasably disengaging the striker bar when said armature is in said retracted position;

a spring mounted to said planar surface of said housing for movement in a plane substantially parallel to said planar surface and for urging the striker bar to move the door a predetermined kick-out distance to an open position; and means for selectively energizing said solenoid windings.

21. The solenoid assembly of claim 20 wherein said spring includes a leaf spring having a first end secured to said housing and a second end adapted to elastically deflect in said plane substantially parallel to said planar surface from a non-deflected position to a deflected position in response to engagement of the striker bar therewith upon the door being moved to its closed position.

22. The solenoid assembly of claim 21 further comprising a bumper mounted to an underside surface of said second end of said leaf spring, said bumper engageable with a portion of said housing to limit deflection of said leaf spring upon the door being closed.

23. The solenoid assembly of claim 20 further comprising:

a mounting flange on said housing, said mounting flange having a face defining said planar surface; and a plurality of posts extending outwardly from said mounting flange;

said spring means being connected to said housing by being interleaved and biased between said posts.

24. The solenoid assembly of claim 23 wherein said spring means comprises:

a first end section secured to said housing;

an arcuate intermediate section extending from said first end and biased between said posts extending from said housing; and a cantilevered second end section extending from said intermediate section and provided for engaging the striker bar and deflecting in response thereto when the door is in the closed position, said deflection of said second end section urging the door to an open position when said latch means releases said striker bar.

* * * * *